United States Patent
Wilhelm et al.

(10) Patent No.: US 8,143,367 B2
(45) Date of Patent: Mar. 27, 2012

(54) METHOD FOR THE ESTERIFICATION OF TEREPHTALIC ACID WITH BUTANEDIOL, METHOD FOR THE MANUFACTURE OF POLYBUTYLENE TEREPHTALATE AND A DEVICE THEREFOR

(75) Inventors: Fritz Wilhelm, Karben (DE); Michael Reisen, Frankfurt (DE)

(73) Assignee: Lurgi Zimmer GmbH, Frankfurt am Main (DE)

( * ) Notice: Subject to any disclaimer, the term of this patent is extended or adjusted under 35 U.S.C. 154(b) by 416 days.

(21) Appl. No.: 12/161,858

(22) PCT Filed: Jan. 24, 2007

(86) PCT No.: PCT/EP2007/000594
§ 371 (c)(1),
(2), (4) Date: Feb. 19, 2009

(87) PCT Pub. No.: WO2007/085433
PCT Pub. Date: Aug. 2, 2007

(65) Prior Publication Data
US 2009/0221768 A1 Sep. 3, 2009

(30) Foreign Application Priority Data
Jan. 24, 2006 (EP) .................................. 06001462

(51) Int. Cl.
*C08G 63/04* (2006.01)
(52) U.S. Cl. ........................ 528/279; 528/283
(58) Field of Classification Search .................. 528/279, 528/283
See application file for complete search history.

(56) References Cited

U.S. PATENT DOCUMENTS

| | | | | |
|---|---|---|---|---|
| 2,727,884 A | * | 12/1955 | Coulter et al. | 526/88 |
| 2,832,674 A | * | 4/1958 | Ranzenberger | 422/198 |
| 3,206,287 A | * | 9/1965 | Crawford | 422/135 |
| 3,399,873 A | | 9/1968 | Dybal et al. | 263/15 |
| 3,466,150 A | | 9/1969 | Dietze et al. | 23/285 |
| 3,486,865 A | * | 12/1969 | Otohata et al. | 422/135 |
| 3,498,754 A | * | 3/1970 | Yamashita et al. | 422/135 |
| 3,679,651 A | * | 7/1972 | Kii et al. | 526/64 |
| 4,056,514 A | * | 11/1977 | Strehler et al. | 528/274 |
| 4,346,213 A | * | 8/1982 | Hall et al. | 528/272 |
| 4,439,597 A | * | 3/1984 | Hall et al. | 528/272 |
| 4,499,261 A | * | 2/1985 | Heinze et al. | 528/279 |
| 4,656,241 A | * | 4/1987 | Iida et al. | 528/279 |
| 4,670,580 A | * | 6/1987 | Maurer | 560/89 |
| 4,680,376 A | * | 7/1987 | Heinze et al. | 528/279 |
| 4,780,527 A | * | 10/1988 | Tong et al. | 528/279 |
| 5,015,759 A | * | 5/1991 | Lowe | 560/91 |
| 5,464,590 A | * | 11/1995 | Yount et al. | 422/131 |
| 5,466,419 A | * | 11/1995 | Yount et al. | 422/131 |
| 5,519,108 A | * | 5/1996 | Yuo et al. | 528/287 |
| 6,060,579 A | | 5/2000 | Ohme et al. | 528/279 |

(Continued)

FOREIGN PATENT DOCUMENTS
CN 1687179 A 10/2005
(Continued)

*Primary Examiner* — James J Seidleck
*Assistant Examiner* — Peter A Salamon
(74) *Attorney, Agent, or Firm* — Seed IP Law Group PLLC

(57) ABSTRACT

The present invention relates to an improved method for the esterification of terephthalic acid with 1,4-butanediol, an improved method for the manufacture of polybutylene terephthalate as well as reactors and devices that are suited for the application in this method.

14 Claims, 3 Drawing Sheets

U.S. PATENT DOCUMENTS

| | | | |
|---|---|---|---|
| 6,359,106 B1 * | 3/2002 | Nakamoto et al. | 528/308.6 |
| 6,590,062 B2 * | 7/2003 | Yamaguchi et al. | 528/308.6 |
| 6,657,040 B1 | 12/2003 | Heitz et al. | 528/279 |
| 6,812,321 B1 * | 11/2004 | Heitz et al. | 528/309.1 |
| 6,967,235 B2 * | 11/2005 | Seidel et al. | 528/279 |
| 7,084,234 B2 * | 8/2006 | Wilhelm et al. | 528/271 |
| 7,153,927 B2 * | 12/2006 | Wilhelm et al. | 528/308.5 |
| 7,241,855 B2 * | 7/2007 | Deiss et al. | 528/272 |
| 7,244,806 B2 * | 7/2007 | Wilhelm et al. | 528/272 |
| 7,550,116 B2 * | 6/2009 | Wilhelm et al. | 422/135 |
| 2002/0128399 A1 * | 9/2002 | Nakamoto et al. | 526/68 |
| 2003/0069339 A1 * | 4/2003 | Takenaka et al. | 524/222 |
| 2004/0106746 A1 * | 6/2004 | Wilhelm et al. | 525/418 |
| 2004/0236067 A1 * | 11/2004 | Seidel et al. | 528/308.6 |
| 2005/0222371 A1 * | 10/2005 | Wilhelm et al. | 528/196 |
| 2006/0009608 A1 * | 1/2006 | Wilhelm et al. | 528/272 |
| 2006/0030727 A1 | 2/2006 | Wilhelm et al. | 560/76 |
| 2008/0064834 A1 | 3/2008 | Wilhelm et al. | 526/68 |

FOREIGN PATENT DOCUMENTS

| | | |
|---|---|---|
| DE | 195 37 930 A1 | 4/1997 |
| DE | 102005019732 A1 * | 11/2006 |
| EP | 0431977 | 12/1990 |
| EP | 0869141 | 3/1998 |
| JP | 2001323053 A * | 11/2001 |
| JP | 2004002902 A * | 1/2004 |
| JP | 2008308679 A * | 12/2008 |
| WO | WO 9928033 A1 * | 6/1999 |
| WO | WO 0250159 A1 * | 6/2002 |
| WO | WO 02/098947 A1 | 12/2002 |
| WO | WO 03093345 A1 * | 11/2003 |
| WO | WO 2004033526 A1 * | 4/2004 |
| WO | WO 2005035109 A1 * | 4/2005 |
| WO | WO 2005116105 A1 * | 12/2005 |
| WO | WO 2006048123 A1 * | 5/2006 |
| WO | WO 2007085433 A1 * | 8/2007 |

* cited by examiner

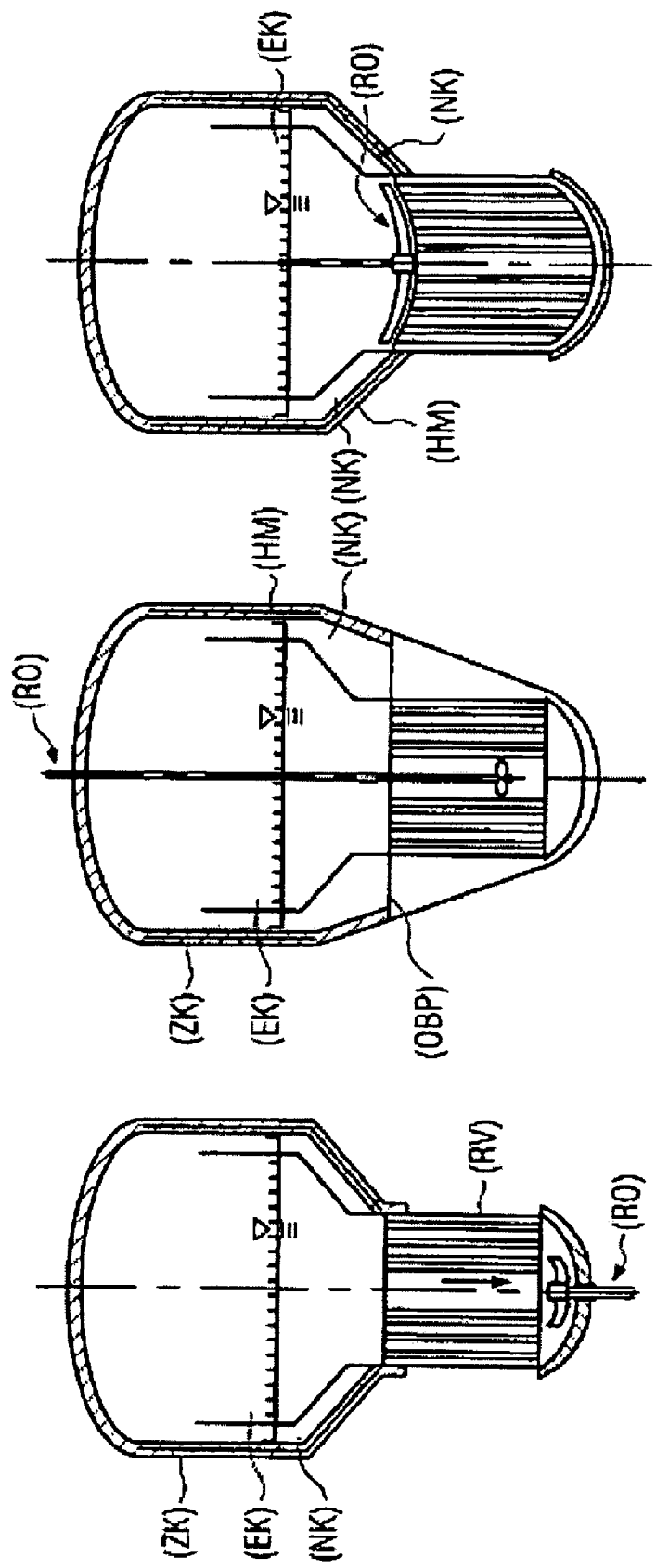

METHOD FOR THE ESTERIFICATION OF TEREPHTALIC ACID WITH BUTANEDIOL, METHOD FOR THE MANUFACTURE OF POLYBUTYLENE TEREPHTALATE AND A DEVICE THEREFOR

The present invention relates to a method for the esterification of terephthalic acid with butanediol, a method for the manufacture of polybutylene terephthalate as well as device appropriate for this method.

The manufacture of polybutylene terephthalate (PBT) from terephthalate acid (TPA) and 1,4-butanediol (BD) is known from prior art.

In prior art, PBT is usually manufactured in a continuous three-stage method. In a first reaction stage, the so-called esterification stage, TPA is esterified with BD and hydroxybutyl groups formed in parallel. The esterification product is subsequently subjected to a first polycondensation in a second reaction stage, the so-called prepolycondensation stage. In the terminating third stage, the polycondensation stage, a further polycondensation to the final medium to high viscous product is finally performed.

Such methods are known, for example, from the U.S. Pat. No. 6,590,062 B2 as well as U.S. Pat. No. 6,359,106 B1. In the methods described therein, in the first esterification stage, TPA is reacted with BD to form an oligomeric esterification product with a number average of the degree of polycondensation of 2 to 5. Subsequently, a usual further processing by condensation reactions is performed.

Similar methods are also disclosed in the US citations U.S. Pat. No. 4,680,376 as well as U.S. Pat. No. 5,015,759. These citations include that the TPA turnover in the esterification stage or the esterification degree of the TPA is usually 95%.

In this context, the EP 0 869 141A1 (U.S. Pat. No. 6,060,579) discloses that it is preferred to observe a molar ratio of BD:TPA of 1.1 to 1.6 in the esterification stage, in case of turnovers, based on TPA, of approx. 97%. The examples of this European patent application also show that in the manufacture of polybutylene terephthalate, in the esterification stage already, oligomeric products are formed into the esterification reactors. U.S. Pat. No. 4,656,241 and U.S. Pat. No. 4,780,527 also describe methods for the manufacture of polybutylene terephthalate where a relatively low molar ratio of BD:TPA is used. U.S. Pat. No. 4,656,241, for example, describes a molar ratio of 0.4 to 1.3.

With regard to the devices that are appropriate for the manufacture of polybutylene terephthalate and in particular for the esterification stage, the prior art discloses usual reactors, in particular stirred tank reactors. The use of such conventional stirred tank reactors is indicated, for example, in the European applications EP 0 431 977 A2 (U.S. Pat. No. 5,015,759) and EP 1 189 968 A1 (U.S. Pat. No. 6,657,040). Similar systems describing the first esterification stage as stirred tank reactor are also disclosed in WO 01/00704 A1 (U.S. Pat. No. 6,657,040), WO 02/098947 A1 (U.S. 2004/236067 and U.S. Pat. No. 6,967,235), and DE 101 27 146 A1 (U.S. 2004/236067 and U.S. Pat. No. 6,967,235).

With regard to the reaction procedure of the first discontinuous reaction stage for the esterification, U.S. Pat. No. 4,346,213 finally discloses that it is important for the reaction product of the esterification stage to still contain unreacted terephthalic acid, approx. 10 to 30 weight percent, to obtain better polymerization results.

In connection with known continuous manufacturing methods for polybutylene terephthalate, the prior art discloses that the esterification has to be performed in stirring stages by which esterification products with a mean polycondensation degree of approximately 2 to 5 can be obtained. In this case, the TPA turnover should not be too high as it turned out to be advantageous if still unreacted TPA remains in the esterification product as thus an improvement of the polycondensation results can be achieved. Furthermore, the above discussed prior art discloses with respect to the esterification reaction as well as with respect to the polycondensation reaction for the manufacture of polybutylene terephthalate that catalysts are employed, in particular catalysts based on organic titanium compounds. Typical titanium compounds appropriate for this purpose are alkyl titanates, as they are, for example, disclosed in the international patent publications WO 01/00704 A1 (U.S. Pat. No. 6,657,040) and WO 02/098947 A1 (U.S. 2004/236067 and U.S. Pat. No. 6,967,235).

A disadvantage of the conventional manufacturing methods for polybutylene terephthalate is, however, that the required, comparably large amounts of catalyst lead to the final polymerisation product containing relatively high proportions of undesired compounds introduced into the method product by the catalyst. Furthermore, the catalysts employed for the polycondensation are liable to hydrolysis, which has negative effects on the reaction procedure as well as on the quality of the final polymer. Due to these disadvantages of the prior art, the following problems in the manufacture of polybutylene terephthalate can occur:

Increasing yellowing in the final product (increased b-value)
Superimposed blue and grey colorations
Reduced L-value
Tendency to a secondary photolytic greying of product surfaces and extreme reduction of the white degree in UV-light catalyst precipitations
Polymer turbidity
Risk of formation of residues in continuous operation
Reduced filterability of product melts.

The object of the present invention is thus to provide an improved method for the manufacture of polybutylene terephthalate by which the above-mentioned problems are overcome individually, partially or altogether.

SHORT DESCRIPTION OF THE INVENTION

The inventors of the present application surprisingly found out that a new design of the esterification stage permits to provide an improved method for the manufacture of polybutylene terephthalate. The essential improvement concerns the procedural method of the esterification stage. A new and inventive esterification method for the reaction of TPA with BD is defined in claim 1 according to the invention. Preferred embodiments of this method are specified in claims 2 to 8. Claim 9 characterizes the method according to the invention for the manufacture of polybutylene terephthalate. Claims 10 to 15 define preferred embodiments of this method. Claims 16 to 20 finally disclose devices appropriate for performing the methods according to the invention.

SHORT DESCRIPTION OF THE FIGURES

FIGS. 2 to 4 show preferred embodiments of the reactor according to the invention for the esterification stage.

DETAILED DESCRIPTION OF THE INVENTION

Figure 1:
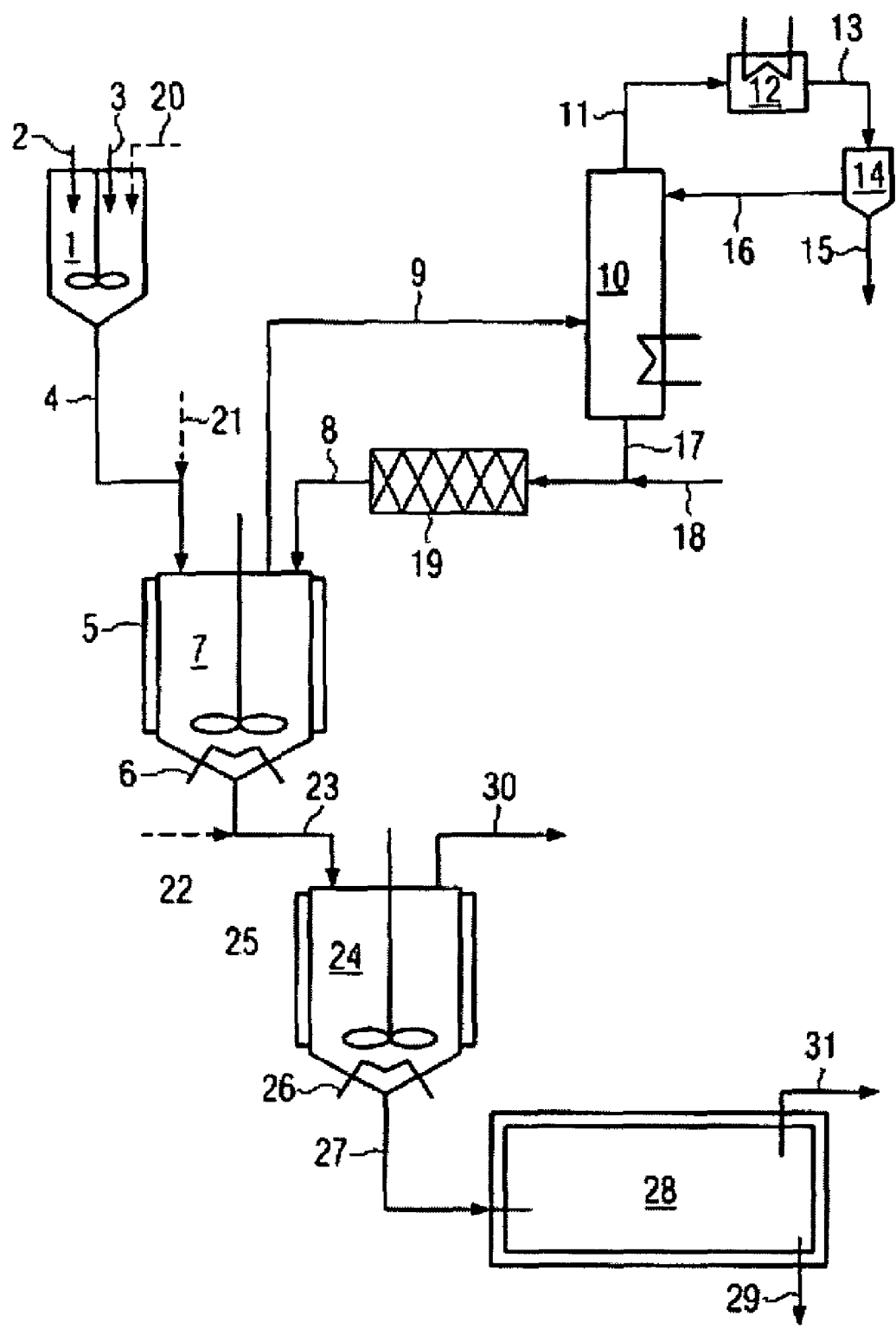
FIG. 1 shows a flow chart of a continuous method for the manufacture of polybutylene terephthalate in conformity with the present invention.

The present invention is in particular characterized in that a new method procedure for the esterification of TPA and BD is provided. This new method procedure is characterized in that the reaction procedure described in the prior art for the esterification in a stirred tank reactor is modified such that in the esterification, after a first stirred esterification zone, a follow-up zone is provided in the esterification stage, the follow-up zone being characterized in that the reaction mixture is not stirred in this follow-up zone. By this reaction procedure, back-mixing is avoided or suppressed in the follow-up zone. The individual stages of the esterification according to the invention will be described below.

First, the components necessary for the esterification of TPA and BD, that means in particular the above-mentioned starting products TPA and BD, as well as a common catalyst, preferably on titanium basis, are provided. The catalyst is here preferably provided as solution, preferably in the form of a diolic solution, in particular 1,4-butanediol as main component of the solvent is preferred. The starting compounds TPA and BD can first be transformed to a pasty starting mixture with a molar ratio of BD to TPA of 1.0 to 1.8, where an overall feed-in molar ratio, together with the 1,4-butanediol to be recycled via the process column, of 2 to 4, preferably 2.8 to 3.8, in particular preferred 3.0 to 3.5, is adjusted. These starting products, i.e., the pasty starting mixture as well as the catalyst solution, possibly in combination with the recycled process diol, can then be fed into the reactor for the esterification reaction in an appropriate and usual manner. Apart from the components essential according to the invention, appropriate further components can be also introduced into the esterification stage, as long as the esterification reaction is not affected thereby. In this context, in particular common additives for the desired final product, such as stabilizers, etc., or additional components facilitating the reaction procedure, are suited. Furthermore, it is possible according to the invention to add further diol components and/or dicarboxylic acid components to the above-mentioned starting substances TPA and BD, as long as the essential proportion of the starting monomers consists of TPA and BD. By metered addition of further diol components and/or dicarboxylic components, it is possible to produce mixed esterification products from which copolyesters can be obtained in a subsequent condensation. However, the use of TPA and BD as dicarboxylic acid component or diol component, respectively, is preferred.

The esterification reaction according to the invention is preferably performed at pressures below atmospheric pressure. In particular, pressures of less than 800 mbar are preferred, in particular preferred are 350 to 600 mbar, more preferred 400 to 500 mbar. The temperature of the esterification reaction in conformity with the present invention is preferably higher than 230° C., in particular preferred from 235 to 250° C., more preferred from 239 to 246° C.

According to the invention, the esterification reaction is furthermore preferably controlled such that the mean degree of polycondensation (Pn) is greater than 3, more preferred greater than 3.5, in particular preferred 5 to 6. The TPA turnover is preferably more than 97.5%, more preferred more than 98%; in particular preferred are 99.0% to 99.7%.

The average residence time ($t_R$) of the starting components in the esterification reaction is preferably less than 2.5 hours, more preferred less than 2.3 hours; in particular preferred are 1.7 to 2.25 hours.

As already illustrated above, the esterification reaction in conformity with the present invention is characterized in that after a stirred first reaction zone, a follow-up zone without stirring is provided. In view of the reaction time stated above (mean residence time), it is preferred for the follow-up phase to make up at least 5% of the complete time, preferably 7 to 15% of the complete esterification time, more preferred 8 to 14%.

According to the invention, in the continuous stationary method, it is preferred for the isobaric two-step reaction procedure according to the invention to be designed such that after a stirred reaction zone, a stir-free follow-up zone is provided. According to the invention, it is in particular preferred to realise a plug flow in the follow-up zone where no stirring is performed.

The method according to the invention can be preferably performed continuously, the starting products first being introduced into the first reaction zone in an appropriate manner (see, for example, the two above-mentioned international applications). An appropriate method procedure principally known to the person skilled in the art ensures that the incorporated starting components are withdrawn from the reactor after the desired reaction time. Furthermore, by corresponding dimensioning of the reactor, comprising the stirred first reaction zone as well as the non-stirred follow-up zone, the advantageous residence time distribution according to the invention between the stirred reaction zone and the non-stirred follow-up zone is ensured. In this context, it is particularly preferred for the follow-up zone to make up at least 5 Vol.-% of the whole volume available for the esterification reaction, in particular 7 to 15 Vol.-%, and more preferred 8 to 14 Vol.-% of the whole reaction volume.

In view of the reaction procedure in the follow-up zone it is essential that here no stirring is performed any more, so that back-mixing is excluded as far as possible. According to the invention, a very high turnover, based on TPA, can thus be achieved. Moreover, here BD can be additionally fed in. Appropriate amounts of BD for such a feeding into the follow-up zone are, based on the originally fed-in TPA, up to 10 mole %.

It is furthermore preferred if volatile components in the follow-up zone, in particular water and possibly BD, are withdrawn from the reaction mixture. Here, a reduction of the vaporizable product components, in particular water and BD, to approx. 30 to 60% of the concentration in the stirred reaction zone is preferred. To this end, it is also possible to increase the reaction temperature during the follow-up phase in comparison to the stirred reaction phase.

According to the invention, by the esterification stage in conformity with the present application, a homogenous esterification product of TPA and BD is obtained, with a TPA turnover of more than 98%, with a mean polycondensation degree of more than 3. The preferred embodiments illustrated above in connection with the reaction procedure, in particular with respect to the TPA turnover and the degree of polymerization, apply to the product obtained at the end of the esterification reaction.

With the homogeneity and gas freedom of the esterification product, according to the invention a stable flow rate control and a stationary flow rate are achieved in the continuous overall process.

This product can in particular be used for the manufacture of polybutylene terephthalate, preferably in conformity with a conventional method procedure, as described above in connection with the prior art. Such a conventional reaction procedure comprises, following the esterification stage, a first and a second condensation stage, i.e., precondensation and polycondensation.

According to the invention, it is preferred in this context for the pressure to be further reduced in the further condensation stages, in the first condensation stage (precondensation) pressures of 5 to 50 mbar, particularly preferred 10 to 25 mbar, being observed. For the terminating second condensation stage (polycondensation), the pressure is preferably reduced to 0.5 to 2.0 mbar, in particular preferred 0.7 to 1.3 mbar. In view of the reaction temperatures, usual process adjustments are appropriate. Preferably, however, the temperature during precondensation is 235 to 245° C., more preferred 238 to 242° C., while the temperature during polycondensation is 240 to 250° C., more preferred 242 to 248° C. The mean residence time for precondensation is preferably 30 to 70 minutes, more preferred 40 to 60 minutes, and for polycondensation 100 to 170 minutes, more preferred 120 to 150 minutes. Precondensation and polycondensation can be appropriately performed in usual reactors. Such reactors are known to the person skilled in the art and described for precondensation for example in WO 2004/033526 (U.S. 2006/009608 and U.S. 7,244,806) and in DE 102004038466 (U.S. 2006/030727). In case of polycondensation, for example the descriptions in DE1745541 (U.S. Pat. No. 3,499,873) and DE102004053199 (U.S. 2008/064834 and U.S. Pat. No. 7,550,116) apply.

According to the invention, in this context it is in particular preferred if the follow-up zone of the esterification is followed by an inlet zone in the precondensation which is neither stirred. This inlet zone preferably makes up at least 25%, preferably 35 to 65% of the precondensation time.

According to the invention, polybutylene terephthalate can thus be produced with a good yield and satisfying reaction time. It surprisingly shown that by the special reaction procedure in the esterification, the amount of catalyst, in particular titanium catalyst, required for the complete reaction, is clearly reduced. This also reduces the problems occurring in connection with the catalyst employment and discussed above. Thus, product quality can in particular be increased and the method procedure can be simplified. Due to the reduced demand for catalyst, the filter lives, for example, are increased by more than 50%. Due to the reduced demand for catalyst, furthermore the costs for the manufacture of polybutylene terephthalate are reduced. Quality penalties due to catalysts, such as color deficiencies and photolytic greying, are also reduced according to the invention.

Such an improvement of the reaction results could not be expected on the basis of the information of the prior art.

According to the invention, it is particularly preferred if the complete required catalyst amount for the manufacture of polybutylene terephthalate is already fed to the esterification stage. This in particular reduces the amount of equipment required as well as the requirements with respect to the method procedure for the subsequent stages of precondensation and polycondensation. As already illustrated above, by the method design of the first stage according to the invention, the complete catalyst demand for the manufacture of polybutylene terephthalate can be clearly reduced. According to the invention, it was found that the catalyst demand is reduced as the TPA turnover α increases or the residual acid proportion s=100−α is reduced. Due to the reduced use of catalyst, there is a reduction of the yellow value b and an increase of the white degree of the manufactured polymeric products.

The catalyst component that is preferably introduced into the reaction in the form of a diolic solution according to the invention in addition preferably comprises stabilizing components. In particular, a stabilization of the catalyst solution with TPA is preferred.

A method according to the invention for the manufacture of polybutylene terephthalate is described below with reference to FIG. 1.

TPA is fed to a stirring vessel (1) via line (2) and BD is fed to the stirring vessel (1) via line (3) and they are mixed to form a paste that is fed via line (4) to a stirred tank reactor (7) surrounded by a heating jacket (5) and equipped with an additional heating element (6) for esterification. During esterification, a liquid BD-oligomer mixture and vapor are formed, the latter essentially comprising water, BD and tetrahydrofuran (THF). Esterification in the stirred tank reactor (7) is performed in the presence of the catalyst solution supplied via line (8). The vapor formed in the stirred tank reactor (7) leaves the stirred tank reactor (7) via line (9) and is supplied to the distillation column (10) where water and THF are separated overhead. The overhead product of the distillation column (10) is supplied via line (11) to the cooling apparatus (12) from which the condensate flows to the reflux distributor via line (14). From the reflux distributor (14), water and THF are withdrawn via line (15) and the reflux is returned to the head of the distillation column (10) via line (16). From the bottom of the distillation column, a mixture predominantly consisting of butanediol is withdrawn via line (17). Via line (18), alkyl titanate is added to the mixture flowing in line (17) by metered addition, resulting in a composition desired for the catalyst solution. The mixture passes a mixture section (19), and via line (8), the produced catalyst solution reaches the stirred tank reactor (7). The catalyst solution can be completely or partially also charged to the stirred vessel (1) via line (20) and/or fed to the paste flow via line (21) into line (4) and/or fed to the transfer line (23) for the esterification product formed in the stirred tank reactor (7) to the precondensation reactor (24). The reactor (24) has a heating jacket (25) and an additional heating element (26). Via line (27), the precondensate from the reactor (24) is supplied to the polycondensation reactor (28). The produced PBT is pumped off via line (29). The formed vapors are sucked off via line (30) from reactor the (24) and via line (31) from the reactor (28). According to the invention, the reactor (7) comprises, in addition to the indicated stirred reaction zone, a non-stirred follow-up zone. Examples of such reactors are disclosed in FIGS. 2 to 4.

The reaction procedure according to the invention permits a reduction of the catalyst use when the non-stirred follow-up zone of the esterification stage is employed. By the method procedure according to the invention, in this case high turnovers of TPA are achieved which are clearly above the prior art as appropriate turnovers. It surprisingly showed according to the invention that it is not a disadvantage to obtain a very high TPA turnover at the end of the esterification stage. The high TPA turnover, in combination with the molar ratio of BD to TPA to be observed according to the invention, ensures stabilization and possibly a reactivation of catalyst proportions which are converted to harmful decomposition products by hydrolysis in the prior art. Due to the method procedure according to the invention, in particular in the follow-up zone of the esterification stage and in the inlet zone of the precondensation, a reactivation of catalyst components can be achieved as the oxidation stage of the catalyst metal can be maintained and the formation of hydroxides liable to precipitation can be prevented. In this context, in particular the further removal of volatile components in the follow-up zone is advantageous, as with a reduced water content of the esterification mixture and an increased molar ratio of BD to water, a reduced liability to catalyst hydrolysis can be observed.

A reactor according to the invention for performing the above-described esterification reaction comprises an esterification reactor with a vertical vessel axis, a heatable jacket, a central inlet chamber with separate connections for feeding the raw materials as paste and the catalyst as diolic solution, a coaxial stirrer for dispersing the charge, and a submerged damper register for transmitting the required process heat. The reactor according to the invention furthermore includes a follow-up zone, preferably a peripheral follow-up chamber, in particular suited for subsequent dissolution of solid TPA from the inlet chamber and homogenisation of the esterification mixture with a flow with only little back-mixing under isobaric conditions. According to the invention, an appropriate follow-up zone is in particular realized in that the inlet chamber above the damper register is enclosed by a radially enlarged internal container opened at the top, and the follow-up zone is designed between the internal container and the external heated container wall as ring channel with a connection to the common steam room opened at the top.

The channel depth for the follow-up zone is preferably less than 800 mm, more preferred 700 mm or less, and in particular preferred 350 mm to 700 mm.

In FIG. 2, an esterification reactor according to the invention is shown. This reactor comprises a Robert evaporator (RV) and a stirring element (RO) at the bottom with radial discharge. Above the evaporator, the reaction room is conically extended up to a cylindrical head region (ZK). A radially enlarged internal container, consisting of an initial cone (above the external reactor cone situated at the bottom) and a cylindrical board at the edge at the external cone end, divides the reactor into an internal central inlet chamber (EK) and an external follow-up chamber (NK) in the form of a ring channel inclined at the side of the cone with a cylindrical degassing gap at the reactor wall opened at the top. The walls contacted by the product are surrounded by an external heating jacket area. The internal area, with the radial-discharge stirring element at the bottom, is the room for the stirred zone of the esterification, while the follow-up chamber represents the non-stirred follow-up zone.

In FIG. 3, an alternative conception is disclosed where the upper base plate (OBP) of the evaporator at the same time forms the lower limiting wall of the external follow-up zone in line with the radial enlargement of the reaction room. The first conical, then cylindrical internal container dividing the reaction room into a central internal chamber and an external follow-up chamber at the edge begins at this base plate. A propeller mixer (RO) in the vertical downpipe of the damper register serves for product circulation and improved raw material distribution in the first zone.

FIG. 4 finally shows a further modified reactor conception with a pear-shaped reactor vessel and a damper register with separate jacket and convex base plates lowered into the tapered bottom space of the reactor. Between the bottom container jacket and the register jacket, there is a free gap for an external down-current of the product corresponding to a vertical up-current in the heating tubes. A stirrer (RO) with upward discharge above the upper tube bottom serves direct admixing and dispersion of the charge fed from above into the central inlet chamber. The division of the upper reaction room into the central inlet chamber (EK) and a peripheral follow-up chamber (NK) in the form of an external ring channel has a design similar to the arrangement already described in FIG. 2.

In FIGS. 2 to 4, furthermore the filling level is indicated. Below the line (⊥⊥⊥), there is the (liquid) reaction mixture, the steam room is located above, possibly together with some foam.

Figure 5:
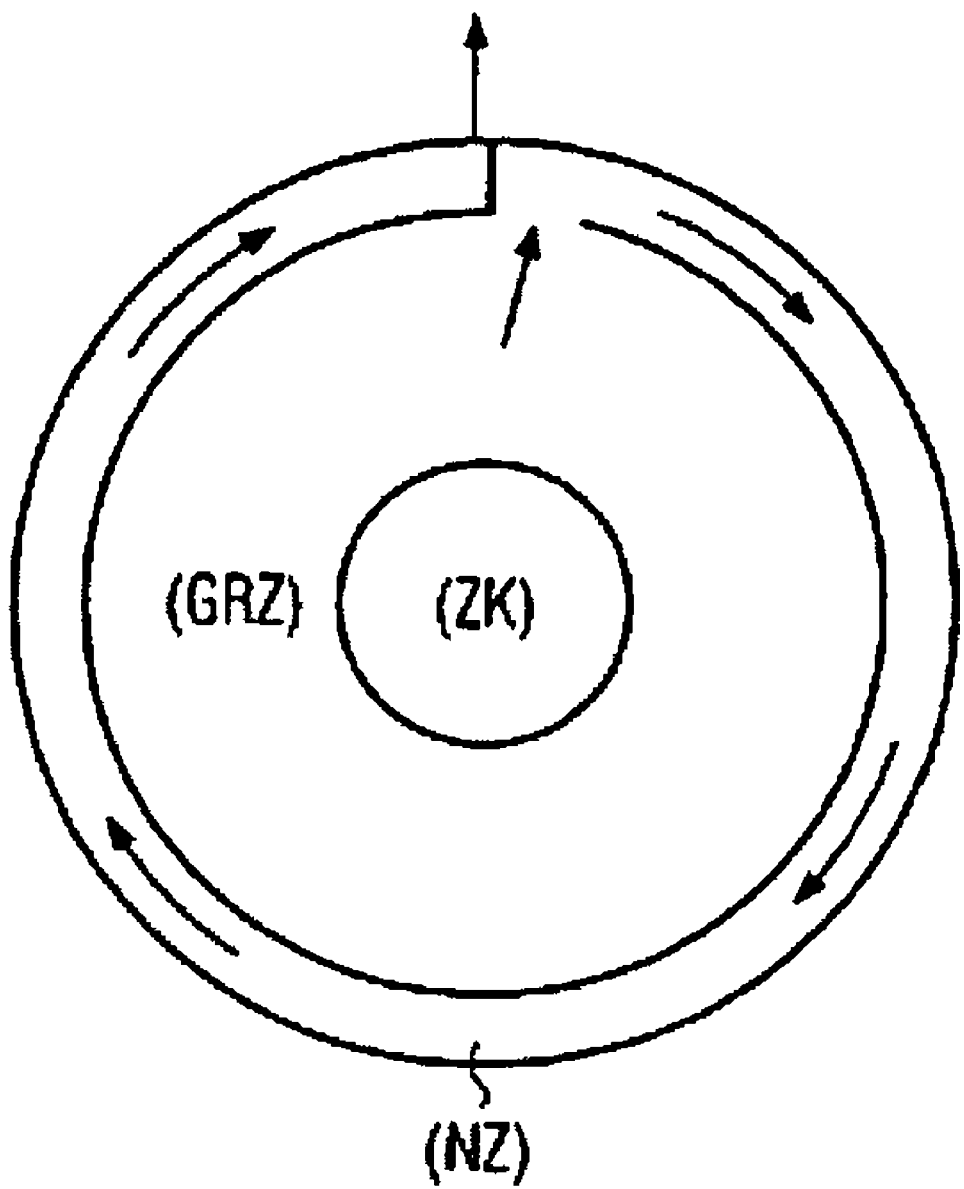
FIG. 5 shows a schematic plan view of a reactor in conformity with the present invention.

FIG. 5 finally shows a schematic plan view onto a reactor in conformity with the present invention, with an internally disposed stirred reaction zone (GRZ) and an externally surrounding follow-up zone (NZ), as well as a central channel, e.g., for attaching (ZK) a stirring element.

Such a reactor for esterification can be connected with further known devices for precondensation and polycondensation. The equipment conception of the continuation of the non-stirred follow-up zone of the esterification into an inlet zone of the precondensation in particular preferred according to the invention was already described above. The equipment conception of the prepolycondensation stage as sequence of at least one level bottom and a stirred discharge bottom is already described in the EP 1 478 677 (U.S. 2006/009608 and U.S. Pat. No. 7,244,806) which is incorporated herein by reference. The flow channels are here preferably self-emptying and free from a dead space, as described in the German patent application DE 10 2004 38 466.5 (U.S. 2006/030727). This application, too, is included herein by reference.

As end reactor for the polycondensation of the precondensate, all reactor types appropriate for this purpose and known to the person skilled in the art can be used, as in particular stirring disk or cage reactors, preferably stirring disk reactors.

EXAMPLE AND COMPARATIVE EXAMPLE

The degree of polycondensation mentioned in the application which is, for example, described in connection with the esterification, can be determined in conformity with the following embodiments.

The acid number (AN) is measured in mg KOH per gram of esterification product added by weighing. The non-reacted acid end groups of the product dissolved in dimethyl formamide are determined by means of titration with alcoholic KOH from the difference to a blind sample.

The saponification number (SN) is also measured in mg KOH per gram of esterification product added by weighing. Here, the esterification product is reacted with boiling alcoholic KOH and the remaining KOH is titrimetrically determined.

As the esterification product added by weighing also contains free diol, water and non-reacting additives, their percentage by mass (ADD) also has to be determined.

The saponification number corresponds to the complete employed amount of acid end groups, while the acid number represents the not yet reacted acid end groups. Therefore, the TPA turnover e is:

$$e = 1 - \frac{AN}{SN}$$

The degree of polycondensation or the mean chain length of the PBT esterification product can be calculated from SN, AN and ADD by means of the following formula:

$$P_n = \frac{1}{1245{,}118 \cdot \frac{1-ADD}{SN} + 1{,}6 \cdot \frac{AN}{SN} - 2{,}44362}$$

Embodiment

In a continuous polycondensation plant with an esterification stage (ES) similar to that of FIG. 2, precondensation (prepoly stage (PP)), equipped with an inlet chamber with a residence time of 15 min, and a polycondensation stage with a ring disk reactor (DRR), the following parameters were adjusted:

|  |  | ES | PP | DRR |
|---|---|---|---|---|
| Pressure | mbar | 450 | 16 | 1 |
| Temperature | °C. | 245 | 244 | 244 |
| Residence time | min | 130 | 40 | 125 |

The esterification was operated with a fed molar ratio of BD to TPA of 3.3, the residence time in the follow-up zone was 12 min, the channel depth was 560 mm, the employed catalyst was 60 ppm in the final product.

In the esterification, there was a turnover of 99.6% and a degree of polycondensation of 6, the final product with an intrinsic viscosity of 0.95 had a chromatic value b of 1.2. In the first stirred zone of esterification, a turnover of 97.9% was achieved. The plant was equipped with a prepoly filter which had a mean life of 5-6 weeks under the mentioned conditions.

Comparative Example

In the same plant, however without follow-up zone in the esterification stage, the following parameters were employed:

|  |  | ES | PP | DRR |
|---|---|---|---|---|
| Pressure | mbar | 400 | 33 | 1 |
| Temperature | °C. | 245 | 248 | 250 |
| Residence time | min | 110 | 60 | 150 |

The fed molar ratio was 2.9 and the employed catalyst was 90 ppm. In the esterification, there was a turnover of 97.8% and a degree of polycondensation of 4.7, the final product had an intrinsic viscosity of 0.93 with a chromatic value b of 3. The expected filter life in this case was only 3-4 weeks.

Laboratory tests in a simple stirring vessel with a residence time of 60 to 90 min at temperatures of 240 to 248° C. and pressures of 400 to 500 mbar showed varying turnovers of between 95% and 98%, even at high catalyst concentrations of 120 ppm to 250 ppm.

Only by the high preliminary turnover in the stirred zone in connection with the employment of the follow-up zone, the turnover could be increased to more than 99%. At the same time, the required amount of catalyst was reduced, the color of the final product was clearly improved and the filter lives were increased. Thus, these examples show that the advantages described in the application can be realized by the new and inventive technical teaching of the present application.

The invention claimed is:

1. A method for the continuous esterification of terephthalic acid with 1,4-butanediol, the method comprising forming an esterification product by reacting terephthalic acid and 1,4-butanediol in a two-stage isobaric reaction procedure comprising a first esterification stage and a second esterification stage, the first esterification stage comprising esterification in a stirred reaction zone, and the second esterification stage comprising esterification in a non-stirred follow-up zone, wherein the esterification comprises a total mean residence time, and the second esterification stage comprises a residence time which is up to 15% of the total mean residence time.

2. The method of claim 1, wherein a reaction product of the esterification comprises an acid turnover, based on terephthalic acid, of more than 98%.

3. The method of claim 1, wherein the esterification product comprises a mean polycondensation degree of more than 3.

4. The method of claim 1, wherein the second esterification stage comprises a residence time which is at least 5% of the total mean residence time of the esterification.

5. The method of claim 1, wherein the esterification has a total mean residence time $t_R$ of less than 2.5 hours.

6. The method of claim 1, further comprising an esterification catalyst in the form of a diolic solution.

7. The method of claim 6, wherein the esterification catalyst is a titanium based catalyst.

8. A method for the continuous manufacture of polybutylene terephthalate, the method comprising the reaction stages of esterification, precondensation and polycondensation, wherein the esterification comprises the method of claim 1.

9. The method of claim 8 further comprising a catalyst, wherein the complete amount of catalyst required for the manufacture of polybutylene terephthalate is added during the esterification stage.

10. The method of claim 8, wherein the non-stirred follow-up zone directly passes over into a non-stirred inlet zone of precondensation.

11. The method of claim 8, wherein the precondensation pressure is lower than the esterification pressure, and wherein the polycondensation pressure is lower than the precondensation pressure.

12. The method of claim 8, wherein the precondensation pressure is lower than 50 mbar.

13. The method of claim 8, wherein the precondensation temperature is equal to or lower than the polycondensation temperature.

14. The method of claim 8, wherein the polycondensation is performed in a stirring disk reactor.

* * * * *